Aug. 22, 1967 C. F. MURPHY 3,337,148

TAPE DRIVE ASSEMBLY

Filed Nov. 12, 1963 2 Sheets-Sheet 1

INVENTOR.
CHARLES F. MURPHY
BY
Price and Heneveld

Aug. 22, 1967 C. F. MURPHY 3,337,148

TAPE DRIVE ASSEMBLY

Filed Nov. 12, 1963

2 Sheets-Sheet 2

INVENTOR.
CHARLES F. MURPHY
BY
Price and Heneveld

United States Patent Office 3,337,148

Patented Aug. 22, 1967

3,337,148

TAPE DRIVE ASSEMBLY

Charles F. Murphy, Vermontville, Mich., assignor to Michigan Magnetics, Inc., Vermontville, Mich., a corporation of Michigan Filed Nov. 12, 1963, Ser. No. 323,020

9 Claims. (Cl. 242—55.12)

This invention relates to a tape recorder drive assembly, and more particularly to a constant speed tape recorder drive assembly comprising a compact assembly.

Tape recorder drive assemblies for tape recorders have presented several significant problems. Probably the chief problem is providing a constant speed drive train having means for reducing "garbling" of recorded sounds and means to reduce recording of vibrational noise created from the drive train assembly itself. This noise is caused from meshing gears, bearing vibration, etc. Presently, a drive belt of resilient material, usually rubber, is employed in the drive train to absorb and lessen the transmittance of gear, motor and bearing vibration. This belt, however, is naturally in tension on one side and in a state of relaxation on the other side. This tension-relaxation differential condition increases with increasing load, and causes undesirable speed differences on the tape drive system. This belt drive moreover, consumes a disproportionately large amount of space, preventing any reasonable degree of compactness.

Another problem is the incompatibility of the necessarily large size and bulkiness of present equipment and the small accommodating space for this equipment for use in close quarters such as aircraft.

Also characteristic of present units is the large flywheel the function of which is to reduce transmittance of drive motor pulses, and also to help reduce vibrational effects tending to alter the constancy of the drive train assembly. This large flywheel, like the belt drive assembly, consumes a disproportionately large amount of space.

Even with these added components to achieve better performance, ball bearings still cannot be employed in present equipment due to the transmission of vibrations caused in them through the belt drive to the tape advancing element, causing undesirable noise on the tape. Consequently, honed bearings using simple rubbing bearing surfaces must normally be employed.

All of these factors, when considered together, detract significantly from efforts to achieve a recording unit which (1) will provide effective, constant speed, noiseless, non-garbled recordings, and (2) will meet critical weight and size limitations.

It is therefore an object of this invention to provide a sound tape drive assembly achieving remarkably superior recording of sound without garbling and without significant background vibrational noise from the drive assembly.

It is another object of this invention to provide a small, compact tape drive or "capstan" assembly requiring only a fraction of the space normally required for comparable or less effective units.

It is another object of this invention to provide a tape drive capstan capable of readily using low friction bearings containing roller elements such as balls, yet without noise resulting on the recording tape.

It is a further object to provide a compact, internal, drive train capstan assembly for a tape that eliminates drive speed fluctuations and is capable of constant speed driving even under different loads.

It is still a further object of this invention to provide a tape capstan drive assembly capable of rapid reversed rewind of the tape with only a slight shift of the position of the mechanism, and using the same drive means. The drive train continues to operate at a constant speed in the same direction of rotation, while resulting in a high speed reversing of the tape reels for rewind. The shift of the mechanism to cause the rewind amounts to only a small fraction of an inch, and causes complete disengagement of the forward drive and subsequent engagement of the rearward drive in a fraction of a second, without disturbing the constant rotational speed of the main portions of the drive assembly.

These and several other objects of this invention will become apparent upon studying the following specification in conjunction with the drawings in which.

Figures 1, 2:
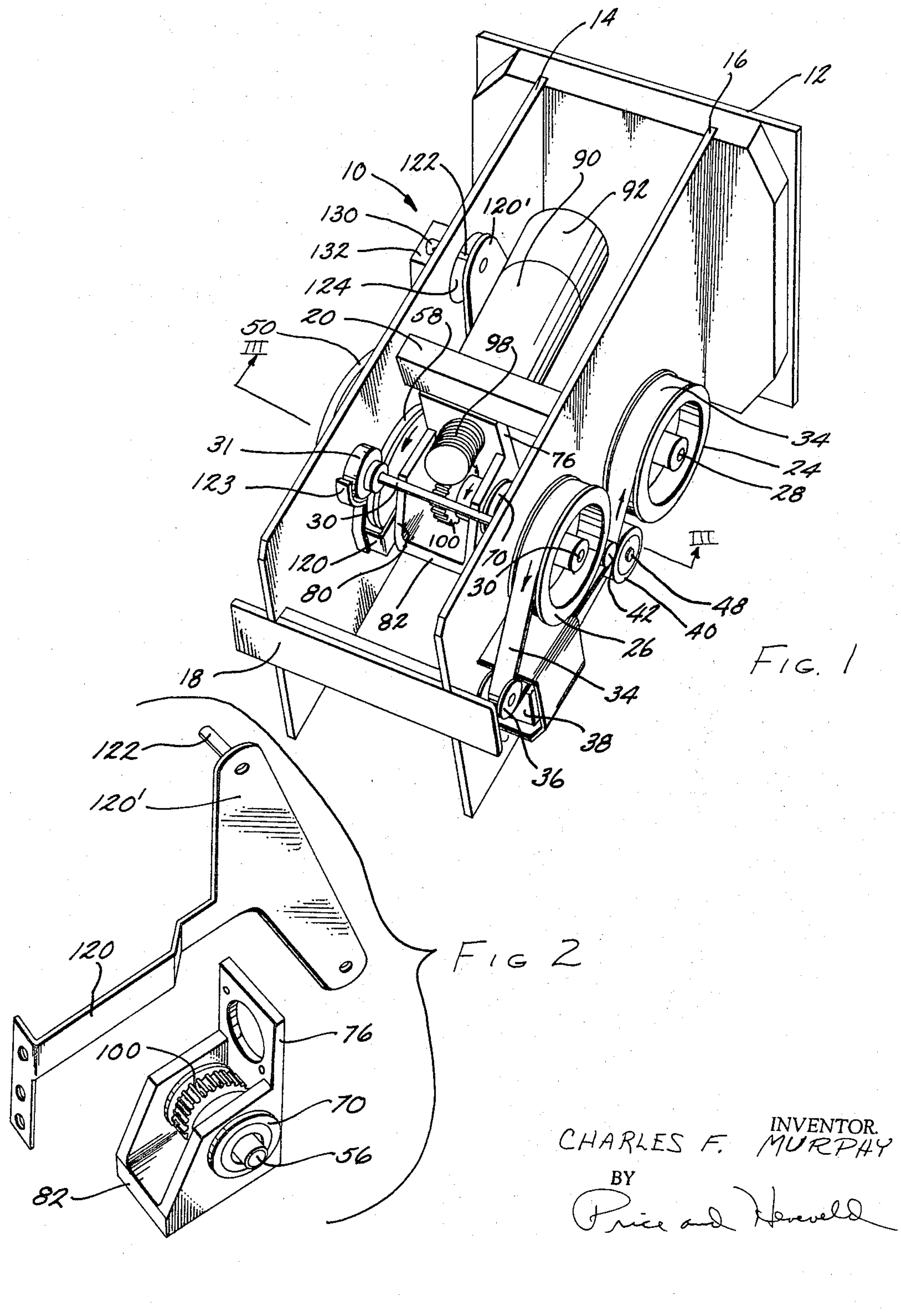
FIG. 1 is a perspective view of the drive assembly in a tape recorder and forming a compact unit used with instrumentation of a craft.
FIG. 2 is an enlarged perspective view of a bracket and lever arm forming part of the assembly in FIG. 1.

Referring now specifically to FIG. 1, the novel apparatus 10 there illustrated is a recorder especially intended for use in an air or spacecraft. It includes a front escutcheon plate 12 having appropriate control knobs (not shown) on the face thereof. A housing shell (not shown) normally fits over this mechanism and abuts against the escutcheon plate for enclosing the mechanism.

Support for the mechanism components is provided by a pair of parallel, adjacent, spaced, rearwardly extending support plates 14 and 16 embedded on one end into the back of the front plate, connected together on the opposite end by a tie bar 18, and connected in the center by a spacer bar 20. The entire operating mechanism is attached to these plates and largely suspended between them.

Attached to the outside of plate 16 is a pair of tape reels 24 and 26, both rotatably mounted. Reel 24 is mounted on a stub shaft 28 attached to plate 16. Reel 26 is mounted on a shaft 30 which extends through plate 16 and to plate 14 for rotative attachment thereto. The magnetic tape 34 itself is normally wound upon reel 26 to be unwound therefrom, around an idler roller 36, past the recording head 38, between the friction wheel 40 and the extended end of drive shaft 42, and wound upon reel 24. Reel 24 is biased rotationally to wind up the tape.

Friction wheel 40 is rotatably mounted on a shaft 48 attached to plate 16. The wheel has a resilient outer surface layer, preferably of rubber or the equivalent, for engagement with shaft 42, or more specifically to squeeze and engage the tape 34 against the upper portion of shaft 42.

The shaft 42 extends through an opening in the plate 16 (FIG. 3) and also through an opening 45 in plate 14. A small flywheel 50 is attached to the end of the shaft adjacent plate 16 utilizing a set screw 52.

Positioned around this shaft is a sleeve means which includes an elongated annular sleeve 56 and a rewind drum 58 attached to the end of sleeve 56. Since the internal diameter of this sleeve over its major portion is larger than the external diameter of the shaft, most of the sleeve is not in engagement with the shaft. However, on its end adjacent plate 16, this sleeve has a sliding bearing contact with the shaft. Also, the inner periphery of a portion of drum 58 has a sliding bearing contact on the opposite end portion of the shaft. Since the drum is attached to the sleeve by being slid over its end and secured thereto by set screws 62, the sleeve is maintained in independently rotational engagement with the shaft.

The sleeve is in turn mounted within the inner races of a pair of ball bearings 70 and 72 on opposite ends of the sleeve. These bearings are both mounted in respective legs or mounting bracket 76. This mounting bracket includes an upstanding back portion, a pair of parallel, spaced, extending legs 78 and 80 on opposite sides thereof, and interconnected by the back and a bottom portion 82 (FIG. 1).

Figure 3:
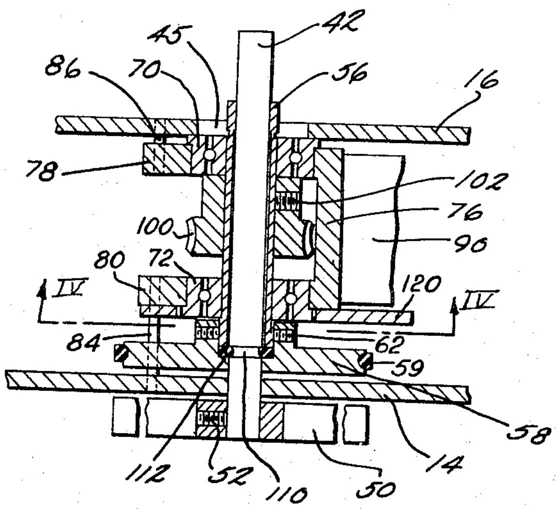
FIG. 3 is a sectional view of the drive train assembly taken on plane III—III of FIG. 1.

This bracket is pivotally mounted to and between the support plates 14 and 16 by pivot pins 84 and 86 (FIG. 3). The resulting horizontal pivotal axis is parallel to the center line of shaft 42 to allow the shaft 42 to be shifted in a small arc with respect to this pivot shaft for reasons to be discussed hereinafter.

Mounted to the back side of this bracket is a small electrical motor 90 having a constant rotational speed output. This motor preferably has a governor 92 thereon to maintain the constant output speed. This prevents pulsing of the motor during operation. Extending through the back plate of support 76 is the drive shaft of the motor to which a worm gear 98 is attached. This worm gear intermeshes with a spur gear 100 fixedly attached to the exterior of sleeve 56 by a suitable set screw 102. Operation of the motor thus drives worm gear 98 to turn the spur gear on an axis perpendicular to the axis of the worm gear. Gear 100 rotates the sleeve.

This sleeve means, and more specifically drum 58, drives the shaft 42 with a special internal drive connection in this assembly. Abutting the end of sleeve 56, and at the end of the central chamber of drum 58 into which the sleeve fits is a drive ring 112. This fits within a groove means formed between the end of sleeve 56, the end of the drum cavity, and an annular concave groove 110 in shaft 42. The resilient annular O-ring type member 112 in its free, expanded state is larger than the groove means. When positioned in the groove means, however, and squeezed by the inserted sleeve 56, it is compressed substantially to form a tight frictional drive connection between the sleeve means and the shaft. Thus, rotational force imparted to the sleeve is imparted to the shaft to rotate the extended end of the shaft on the tape against the resilient wheel 40 thereby advancing the tape. This drive connection has been found to effectively absorb the vibrations produced by the ball bearings 70 and 72 as well as all other vibrations produced between the intermeshing gears or from the motor. Consequently, these low friction bearings can be employed with no significant lessening of recording quality. Moreover, if the load on the tape should increase for some reason, the drive train still maintains a constant rotational speed.

It will be readily appreciated by those in the art that the drive connection shown achieves these advantages while also achieving a completely compact construction. It assumes a significantly smaller amount of space than conventional units. Also, only a small flywheel 50 need be used, thereby further conserving space. The complete apparatus constitutes a package only a few inches in width and height and slightly more in length.

The end of the shaft 42 protruding adjacent friction wheel 40 tightly grips the tape against the friction wheel to drive it forwardly as stated above. Thus, rotation of the motor, the worm gear, the spur gear, the sleeve means, and the shaft drives the tape in the directions indicated by the arrows in FIG. 1 from reel 26 to reel 24. Bracket 76 and motor 90 are retained in this engaging position in a particular orientation on pivot axis 86 by a lever arm 120 (FIGS. 1 and 3). This arm is attached to leg 80 of bracket 76 and extends rearwardly alongside motor 90 and then adjacent plate 14. The upstanding ear 120′ of this arm includes a pin 122 extending through an opening 124 in panel 14 (FIG. 1). The extended end of this pin is attached to the plunger core 130 of a solenoid 132 mounted to the outer surface of panel 14.

Figure 4:
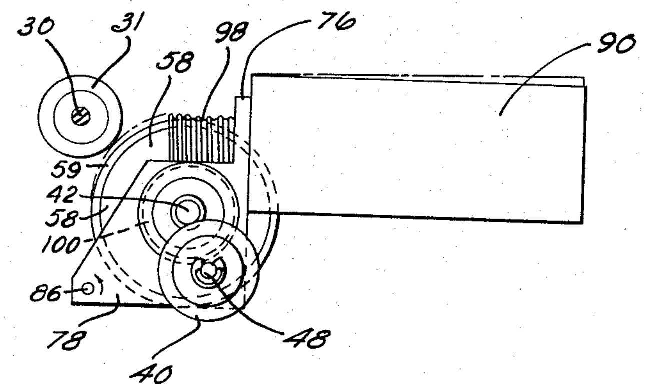
FIG. 4 is a fragmentary, side elevational sectional view of the drive train assembly taken on plane IV—IV of FIG. 3.

Shifting of the electrical solenoid core thus shifts pin 122, ear 120′, lever arm 120, and bracket 76 on pivot axis 86 a fraction of an inch in the manner and to the position shown by the phantom lines in FIG. 4. This shifts the extended end of shaft 42 in a small arc away from the resilient surface of wheel 40, and shifts annular resilient friction ring 59 on the outer periphery of rewind drum 58 against the rewind wheel 31 mounted on shaft 30. This rotates shaft 30 in the reverse direction to which it normally rotates, to thereby rewind the tape. Since shaft 42 is pulled out of engagement with wheel 40 at this time, the tape can freely move back around reel 26. The rewind speed is considerably faster than the forward speed for recording due to the larger diameter of the rewind drum 58.

This rewind mechanism utilizes the same drive connection 112–110 between the sleeve means and the shaft. These continue to move in the same rotational direction and are not reversed. This reversing shift is a small fraction of an inch, for example, about 1/16 inch and is achieved rapidly. Rewinding is effected merely by throwing a switch (not shown) to activate the solenoid 132 and hold it actuated for a desired time. Since the tape is completely released by the drive shaft 42 during rewind, no large stresses are placed upon it.

Preferably, a brake shoe 123 extends upwardly from the end of lever arm 120 and includes an arcuate portion adjacent rewind wheel 31. When the shaft 42 is reengaged with friction wheel 40 to squeeze the tape therebetween, this brake is moved into rubbing contact with wheel 31 to brake it, and to provide a slight bias on unwinding reel 26 to prevent the tape from becoming slack between the reel and drive shaft 42.

*Operation*

During normal usage of the recording mechanism, power is supplied to motor 90 from any suitable source. Rotation of the motor rotates worm gear 98. The worm gear drives spur gear 100, which rotates sleeve 56 and connected drum 58. The resilient internal drive connection formed by the squashed O-ring 112 in the groove means between the shaft, sleeve, and drum causes shaft 42 to rotate without vibration since the ring absorbs the vibrations. Rotation of this shaft and of its extended end bearing against the tape 34 and holding it to wheel 40 advances the tape from reel 26 through the recording head 38 to reel 24.

If the operator wants to rewind the tape from reel 24 onto reel 26 for a fraction of the tape or for the complete tape, a switch (not shown) is thrown to activate solenoid 132. This shifts plunger 130 upwardly (as the structure is viewed in the drawings), to shift lever arm 120, bracket 76, motor 90, and thus shaft 42 in a small arc with respect to pivot axis 86 on the bracket. This causes the periphery of rewind drum 58, and more specifically, the rubber resilient portion 59 thereof against the rewind wheel 31, to rotate reel 26 in the opposite direction. Simultaneously shaft 42 is shifted away from resilient wheel 40 to allow the tape to freely reverse. Reverse movement of the switch (or release thereof as desired) causes reverse action of the solenoid plunger to cause forward tape movement again. During winding and rewinding, the motor, the gears, the sleeve, and the drive shaft are moved in the same direction and at a constant speed.

In addition to the compactness, high quality recording, and vibration-free characteristics of the apparatus, various additional advantages will be apparent to those in the art upon studying the described and preferred form of the invention. Also, various minor modifications in structure can conceivably be made without departing from the inventive concepts involved. Consequently, the scope of this invention is not to be limited merely to the specific preferred form illustrated, but only according to the interpretation of the following claims, and to reasonably equivalent structures to those defined therein.

I claim:

1. A recording tape drive assembly comprising: a shaft; bearing means supporting said shaft for rotation of said shaft; said shaft being positioned to operably engage and advance recording tape; sleeve means around said shaft and rotatable with respect thereto; annular groove means between portions of said sleeve means and said shaft; and a resilient frictional drive ring in said groove means, said ring fitting loosely within said groove means in its free expanded state, adjustable means for partially compressing said drive ring in said groove means to expand said ring radially against the shaft and sleeve means, forming a rotational frictional drive connection between said sleeve means and shaft while absorbing vibrations of said sleeve.

2. The assembly in claim 1 wherein said sleeve means comprises a first portion having a central recess, a second portion having an end 56 of lesser cross-section than said central recess and fitting into said recess, attaching means 62 between said first and second portions for holding the two portions in position with said ring compressed therebetween; and said groove means being formed between the inserted axial end of said second portion, the axial end of said recess, and said shaft, enabling said ring to be squeezed and compressed to a controlled degree.

3. A recording tape drive assembly comprising: a motor; a rotationally mounted drive shaft; a friction wheel adjacent the end of said shaft for engagement therewith to advance a tape therebetween; an annular sleeve means around said shaft and having bearing surface area engaging said shaft; a drive connection from said motor to said sleeve means; said sleeve means being supported on bearings; a variable size groove means formed between said sleeve means and said shaft; a resilient frictional annular drive element in said groove means, said element normally having dimensions larger than said groove means when in a free expanded state; means for partially compressing said annular drive means in said groove means to expand said annular drive means radially outwardly against said shaft, forming a friction drive connection between said shaft and sleeve means, whereby motor, gear, and bearing vibrations are absorbed by said element as it transmits rotational power between said shaft and sleeve means.

4. The assembly in claim 3 wherein said bearings comprise ball bearings.

5. A recording tape drive assembly comprising: a pair of support plates; a mounting bracket suspended between said plates; a motor mounted to said bracket; a drive shaft supported by said bracket; a friction wheel rotationally mounted to one of said plates and adjacent said shaft for engagement therewith to advance a tape therebetween; an annular sleeve means around said shaft and having bearing surface area engaging said shaft; a drive connection from said motor to said sleeve; ball bearings in said bracket supporting said sleeve; variable size groove means formed between said sleeve means and said shaft; a resilient frictional annular O-ring drive element in said groove means; said O-ring element normally having dimensions larger than said groove means when in a free expanded state; and means for partially compressing said O-ring element in said groove means, forming a friction drive connection between said shaft and sleeve means for flattening and radially expanding the same outwardly against said shaft, whereby motor, gear, and bearing vibrations are absorbed by said element as it transmits rotational power between said shaft and sleeve means.

6. A recording tape drive assembly comprising: a pair of support plates; a mounting bracket having a back and a pair of parallel side arms suspended between said plates; a motor mounted to said bracket back; a worm gear attached to and driven by said motor on an axis; a drive shaft supported by and extending between and through openings in said bracket arms on said bracket and being generally normal to said axis; a flywheel attached to one end of said shaft; a friction wheel rotatably mounted to one of said plates and adjacent the opposite end of said shaft from said flywheel for engagement with said shaft to advance a tape therebetween; tape reels rotatably mounted to said one plate and positioned adjacent said opposite shaft end; an annular sleeve means around said shaft and having bearing surface area engaging said shaft; said sleeve means including a sleeve, and a drum connected to said sleeve and having a central opening receiving said sleeve; a drive connection from said motor to said sleeve including said worm gear extending from said motor, and a driven gear affixed to said sleeve and engaged with said worm gear to allow said motor to rotate said driven gear and sleeve; said sleeve being supported on ball bearings in said bracket arms; groove means formed between the end of said sleeve, the axial end of said drum opening, and said shaft; a resilient frictional annular O-ring drive element in said groove means, said O-ring element normally having dimensions larger than said groove means when in a free expanded state and being compressed in said groove means by the end of said sleeve, forming a frictional drive connection, whereby motor, gear, and bearing vibrations are absorbed by said element as it transmits rotational power to drive said tape.

7. A recording tape drive assembly comprising: a pair of support plates; a mounting bracket having a back and a pair of parallel side arms, and suspended between said plates on a pivotal axis; a motor mounted to said bracket back; a drive shaft supported by and extending between and through openings in said bracket arms on said bracket; a flywheel attached to one end of said shaft; a friction wheel mounted to one of said plates and adjacent the opposite end of said shaft for engagement therewith to advance a tape therebetween; tape reels rotatably mounted adjacent said one plate and positioned adjacent said one shaft end; an annular sleeve means around said shaft and having bearing surface area engaging said shaft; said sleeve means including a sleeve and a drum connected to said sleeve; a drive connection from said motor to said sleeve, including a drive gear extending from said motor, and a driven gear affixed to said sleeve and engaged with said drive gear to allow said motor to rotate said driven gear and sleeve; said sleeve being supported on ball bearings in said bracket arms; groove means formed between said sleeve means and said shaft; a resilient frictional annular O-ring drive element in said groove means, said O-ring element normally having dimensions larger than said groove means when in a free expanded state and being partially compressed in said groove means, forming a friction drive connection, whereby motor, gear, and bearing vibrations are absorbed by said element as it transmits rotational power; one of said tape reels being rotatably mounted on a second shaft extending adjacent said drum; said second shaft having a rewind wheel adjacent said drum and normally out of engagement therewith; said drive shaft being parallel to the pivotal axis of said bracket, pivotal shifting of said bracket causing movement of said drive shaft away from said friction wheel, and causing engagement of said drum with said rewind wheel; and means to shift said bracket on said pivotal axis.

8. A recording tape drive assembly comprising: a pair of rotative tape reels and a tape thereon and therebetween; a mounting bracket supported on a pivotal axis; a tape advancing shaft and surrounding sleeve means rotatably supported by said bracket; a motor, means drivingly engaging said motor with said shaft, said engaging means including a compressed internal frictional drive ring between said sleeve and shaft; said shaft being parallel to said pivot axis; shifting means operably connected with said bracket to pivot said bracket on said axis; a rewind wheel adjacent said shaft and drivingly associated on an axle with one of said tape reels; a rewind drum on said advancing shaft adjacent said rewind shaft and normally out of engagement with said rewind wheel; said shifting means being positioned and arranged to cause pivotal movement of said shaft resulting in disengagement of the tape advancing action and engagement of said drum with said rewind wheel to cause drive of said one of said tape reels to rewind the tape thereon.

9. A recording tape drive assembly comprising: a pair of rotative tape reels and a tape thereon and therebetween; a mounting bracket supported on a pivotal axis; a tape advancing shaft rotatably supported by said bracket; a motor, means drivingly engaging said motor with said shaft, said shaft being parallel to said pivot axis; shifting means operably connected with said bracket to pivot said bracket on said axis; a rewind wheel adjacent said shaft and drivingly associated with one of said tape reels; friction means on said shaft adjacent said rewind wheel and normally out of engagement therewith; said shifting means being positioned and arranged to cause pivotal movement of said shaft resulting in disengagement of the tape advancing action and engagement of said friction means with said rewind wheel to cause drive of said one of said tape reels to rewind the tape thereon.

References Cited

UNITED STATES PATENTS

| | | | |
|---|---|---|---|
| 2,686,637 | 8/1954 | Dashiell et al. | 242—55.12 |
| 2,779,211 | 1/1957 | Henrich | 74—574 |
| 3,088,332 | 5/1963 | Arnt | 74—574 |

FRANK J. COHEN, *Primary Examiner.*

G. F. MAUTZ, *Assistant Examiner.*